United States Patent [19]

Guyer

[11] Patent Number: 5,228,668
[45] Date of Patent: Jul. 20, 1993

[54] HAND-HELD BAGEL SLICING JIG

[76] Inventor: Daniel O. Guyer, 2609 Pine Bluff Dr., Metamora, Mich. 48455

[21] Appl. No.: 891,861

[22] Filed: Jun. 1, 1992

[51] Int. Cl.$^5$ ............................................... B26D 7/02
[52] U.S. Cl. ..................................... 269/87.2; 83/455; 83/762; 83/870; 269/270
[58] Field of Search .............. 83/762, 454, 932, 466.1, 83/455, 465, 870; 269/87.2, 265, 268, 270; 30/115, 294

[56] References Cited

U.S. PATENT DOCUMENTS

| | | | |
|---|---|---|---|
| 2,206,154 | 7/1940 | Bixler | 83/454 X |
| 2,206,207 | 7/1940 | Taylor et al. | 269/54.5 |
| 2,679,274 | 5/1954 | Criner | 83/454 X |
| 2,918,099 | 12/1959 | Goldstein | 269/288 X |
| 3,347,296 | 10/1967 | Rothman | 269/87.2 |
| 4,249,445 | 2/1981 | Browning | 83/762 |
| 4,399,989 | 8/1983 | Baillie | 83/762 X |
| 4,550,636 | 11/1985 | Josselson et al. | 83/821 X |
| 4,747,331 | 5/1988 | Policella | 83/762 |
| 4,807,505 | 2/1989 | Campbell et al. | 83/762 X |
| 4,913,412 | 4/1990 | Plovvier | 269/268 X |
| 4,948,106 | 8/1990 | Popeil et al. | 83/762 X |

Primary Examiner—Frank T. Yost
Assistant Examiner—Kenneth E. Peterson
Attorney, Agent, or Firm—James C. McLaughlin

[57] ABSTRACT

A hand-held jig for confining a bagel, or like object, while it is being sliced by a knife blade and a method of using the jig are disclosed. The jig comprises two identical structures that are joined together by a specialized hinge. The two structures are mirror images of each other and each comprises a circular cage (for loosely surrounding the rim of a bagel) that is attached to the hinge on one side and to a radially extending handle on the opposite side, and clamps in front of the cage for retaining and gripping the bagel and preventing its movement. The hinge is composed of material not injurious to a knife blade when it strikes the hinge, and is so constructed as to be fixed with respect to one of the structures and yet allow rotation of the other structure with respect to the hinge.

The process of using the jig comprises rotating apart the two structures, placing a bagel within one cage, bringing the structures together, clamping the handles together with one hand, inserting a knife blade above the bagel within the gap formed between the two structures with the other hand, and moving the knife blade from above the bagel towards the hinge (away from the gripping hand) to effect the partitioning of the bagel.

In the preferred embodiment, the structures are made of thick metallic wire that is bent into the appropriate shapes. The hinge and handle inserts are made of hardwood.

2 Claims, 3 Drawing Sheets

HAND-HELD BAGEL SLICING JIG

TECHNICAL FIELD OF THE INVENTION

The technical field of the present invention is that of hand-held jigs adapted to provide means for confining a bagel, or a similar object, while the confined bagel is being sliced by a knife. The technical field further includes method of using such hand-held jigs.

BACKGROUND INFORMATION

Bagels, and similar breadstuffs, are usually eaten after being sliced open with a knife. A bagel is a breadstuff that is roughly in the shape of a torus. Bagels are customarily sliced such that two slices result, each having a flat surface approximating that of an annulus. Her, "bagel" is to include not only bagels but also similar small breadstuffs such as rolls, biscuits, buns, croissants, Broötchen and the like, and other objects in need of being held while an operation is performed on them.

It is difficult, if not impossible for one satisfactorily to slice a bagel without the bagel being held. It is not uncommon for persons to pinch a bagel between their thumb and other fingers, to insert a knife blade between the web of the pinching hand and the bagel, and then to slice the bagel by moving the knife away from the pinching hand. The opportunity for cutting oneself by executing this procedure is readily apparent. An additional deficiency of this procedure is the inherent difficulty of making a straight cut that produces two essentially equal slices.

Accordingly, an object of the present invention is to provide a compact, hand-held device, and a procedure for using the device, that results in safe and accurate slicing of bagels. It is safe in that the operator's hands are kept distant from the cutting knife. It is accurate in that slices are made along a plane that passes through the middle of the bagel for all sizes of bagels normally encountered. Further objectives of this invention include providing a hand-held device that allows the user to view the bagel while it is being cut, a device that is easy to clean, a device that accommodates to various sizes of bagels, a device that grips the bagel without puncturing its crust, and a device that is inherently inexpensive to construct.

Fixed, non-hand-held devices used to facilitate the slicing of bagels are known. These devices do not meet the objectives of the present invention.

U.S. Pat. Nos. 4,249,445, 4,399,989, 4,550,636, and 4,747,331 disclose devices comprising a pedestal supporting a generally vertical wall against which a bagel is urged by a movable member while the bagel is sliced by a knife moving though a guide that is parallel to, and a fixed distance from, the wall. These devices are generally bulky and heavy (thus not readily portable), not adjustable nor self adjusting (thus slicing may not always be through the middle of the bagel), and fairly complicated (thus rather difficult to clean and to construct).

U.S. Pat. No. 4,807,505 discloses a pair of blocks affixed to a base, separated by a slot, each having a facing cavity shaped to receive half of a bagel, and with the top 70% of one base hinged to swing away from the other block. The swingable portion contains a spike used to impale a bagel to inhibit its movement while being cut. It appears that when used a right handed person would compress the two blocks from above with fingers of the left hand, insert a knife held in the right hand between the fingers of the left hand, and slice downward through the slot. The knife blade passes uncomfortably close to the fingers of the left hand. Since the spacing between the cavity walls is fixed, and only one spike is used, smaller bagels and partially-cut, full-size bagels will have little support. Limited access to the lowest parts of the device complicates cleaning the device. Care must be observed when cleaning the spike, and when the swingable portion is "open," not to be injured by the spike. A need remains in the art for a device that is free of sharp parts, that keeps hands remote from the cutting instruments, that is easy to clean, and that will firmly grip small and full-sized bagels while they are being cut.

SUMMARY OF THE INVENTION

The foregoing and other objects and advantages are achieved with the apparatus and process disclosed below. The apparatus is a hand-held jig for confining a bagel, or like object, while it is being sliced by a knife blade. The apparatus comprises two identical structures that are joined together by a specialized hinge. The two structures are mirror images of each other and each comprises a circular cage (for loosely surrounding the rim of a bagel) that is attached to the hinge on one side and to a radially extending handle on the opposite side, and clamps in front of the cage for retaining and gripping the bagel and preventing its movement. The clamps are such that the bagel is gripped even after it is cut and even if it is undersize. The hinge is composed of material not injurious to a knife blade when it strikes the hinge, and the hinge is so constructed as to be fixed with respect to one of the structures and yet allow rotation of the other structure with respect to the hinge.

The process of using the apparatus comprises rotating apart the two structures; placing a bagel within one cage; bringing the structures together; clamping the handles together with one hand; with the other hand, inserting a knife blade above the bagel within the gap formed between the two structures; and moving the knife blade from above the bagel towards the hinge (away from the gripping hand) to effect the partitioning of the bagel. The knife blade begins to cut the bagel while distant from the clamping hand and moves away from the clamping hand. Thus danger to the user is remote.

In the preferred embodiment, the structures are made of thick metallic wire that is bent into the appropriate shapes. The hinge and handle inserts are made of hardwood.

DETAILED DESCRIPTION OF THE INVENTION AND ITS PREFERRED EMBODIMENT

Figure 1:
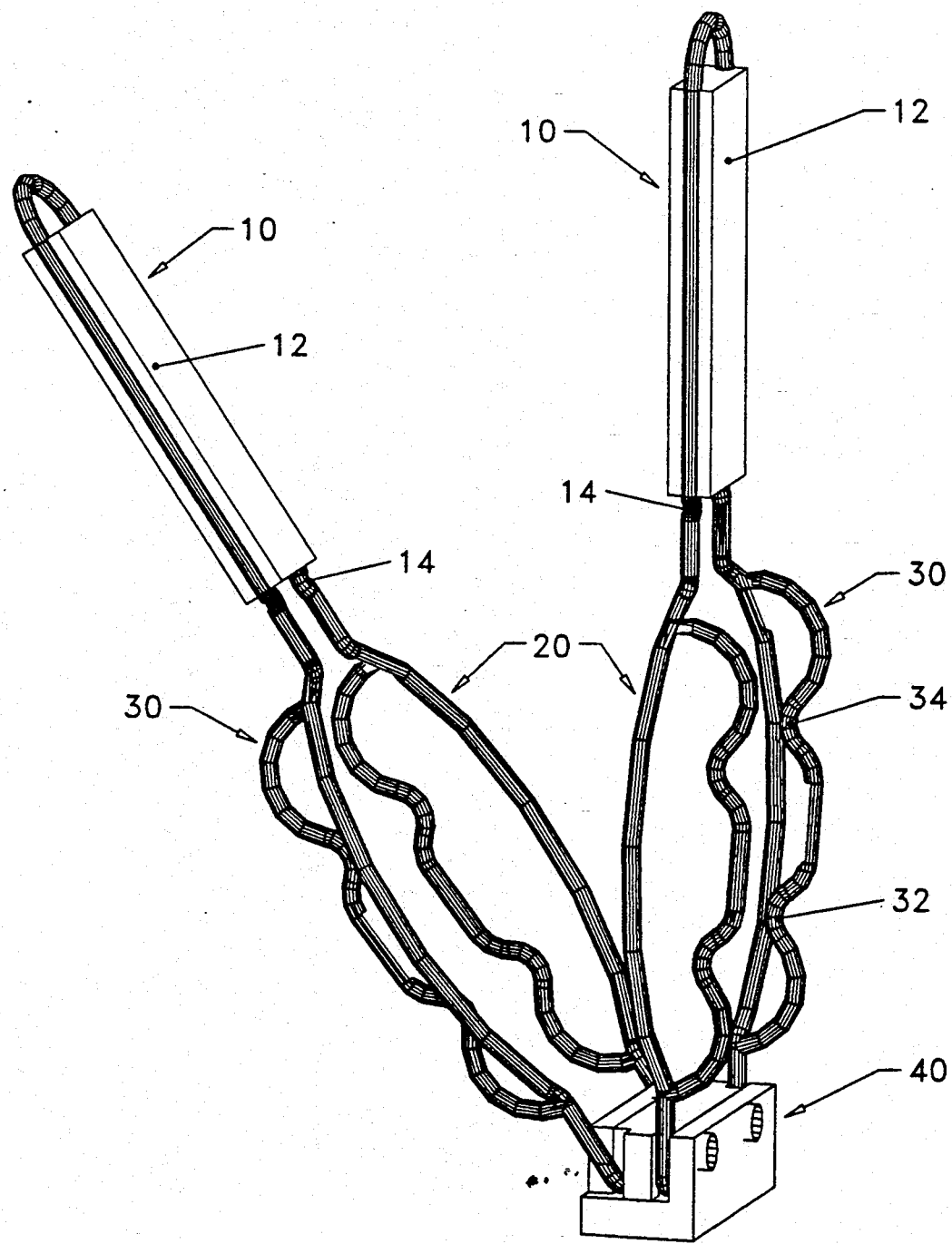
FIG. 1 is a perspective vie of the preferred embodiment of the present invention when open for receiving a bagel.

The overall appearance of the preferred embodiment of the present invention may be gleaned from FIG. 1. For each of the two symmetrical halves of the present invention, one side of essentially circular cage 20 passes into hinge 40 while the opposite side of cage 20 extends into handle 10. The handle, of the present invention, is affixed to the periphery of the cage opposite to where the hinge is attached and the handle extends radially from the cage. Cage 20 is faced with at least one clamp 30 extending across cage 20. In the preferred embodiment, two such clamps 30 are used that are essentially parallel to each other and to handle 10. One or more clamps extending between points on the periphery of a cage could be used.

In the preferred embodiment of the present invention, cage 20, clamps 30, and handle 10 are each made from thick metallic wire approximately 0.156 inches in diameter. Cage 20 and handle 10 are formed from one piece of appropriately formed wire that lies in a plane. In the preferred embodiment, cage 20 has a diameter of approximately 4.4 inches. Clamps 30 are each formed of a single piece of appropriately formed wire, lying in a plane, welded or soldered to cage 20. Thus, the preferred embodiment comprises six pieces of formed wire, two identical pieces for each of the cage 20 and handle 10 combinations, and four identical pieces for the four clamps 30.

Different materials may be used to construct the present invention other than metallic wire. For instance: cage 20, clamps 30, and handle 10 could be molded as a unit using an appropriate plastic and a single die.

One side of each of the two cages 20 passes into hinge 40 and is thereby attached to the hinge. Both such attachments could be rotatable. In the preferred embodiment, hinge 40 is so constructed that it is essentially fixed with respect to one of the cages 20, while allowing the free rotating (or pivoting) of the other cage 20 with respect to hinge 40. The arrangement of one fixed and one rotatable cage (with respect to the hinge) has been found to be optimal. In the preferred embodiment, hinge 40 is constructed from hardwood having an appropriate hardness so as not to injure or dull the blade of a knife that strikes hinge 40 (assuming a reasonable amount of force is used). Different materials, such as plastic, may be used to construct hinge 40.

Figure 2:
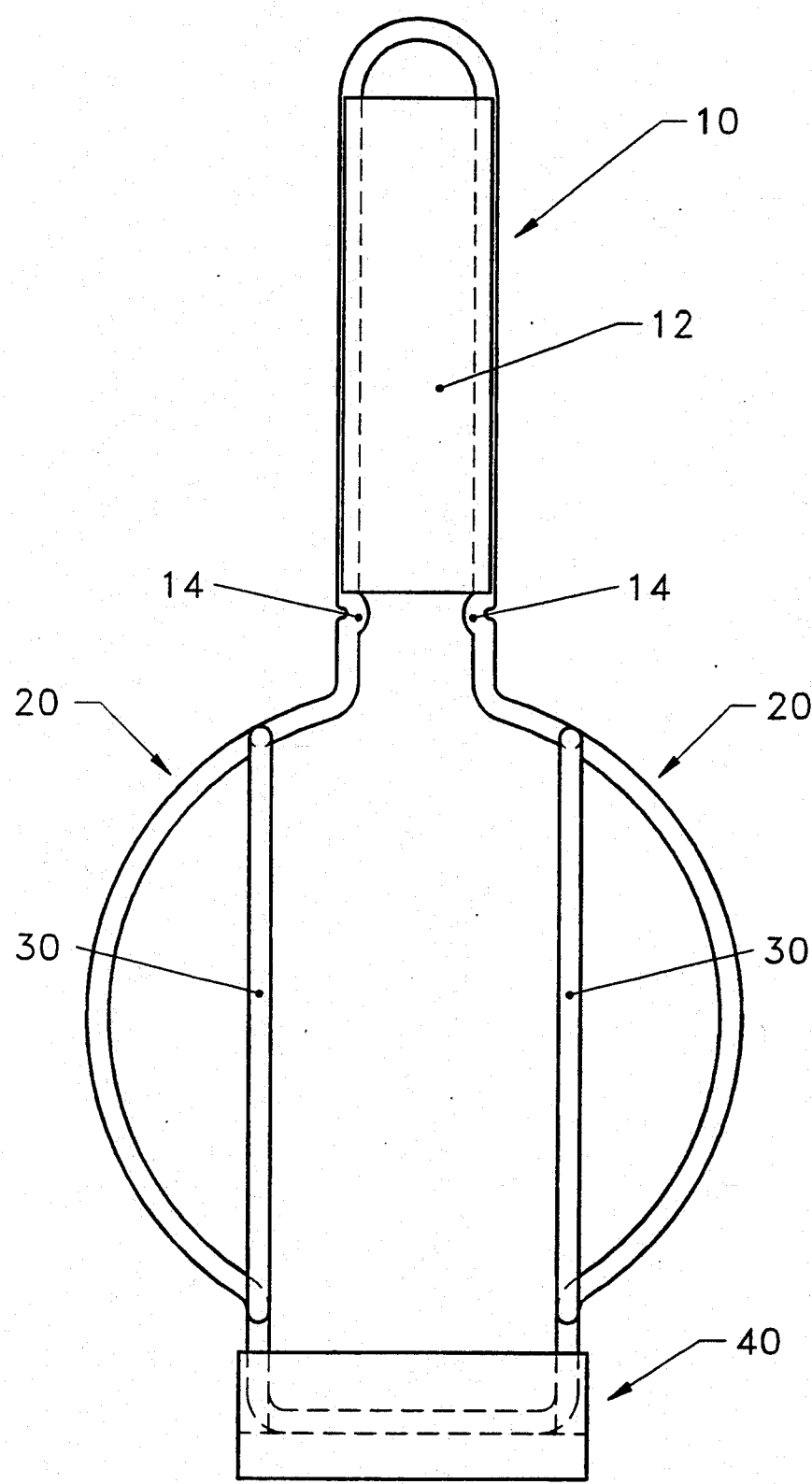
FIG. 2 is a front view of the cage-clamp-handle structure of the preferred embodiment.
Figure 3:
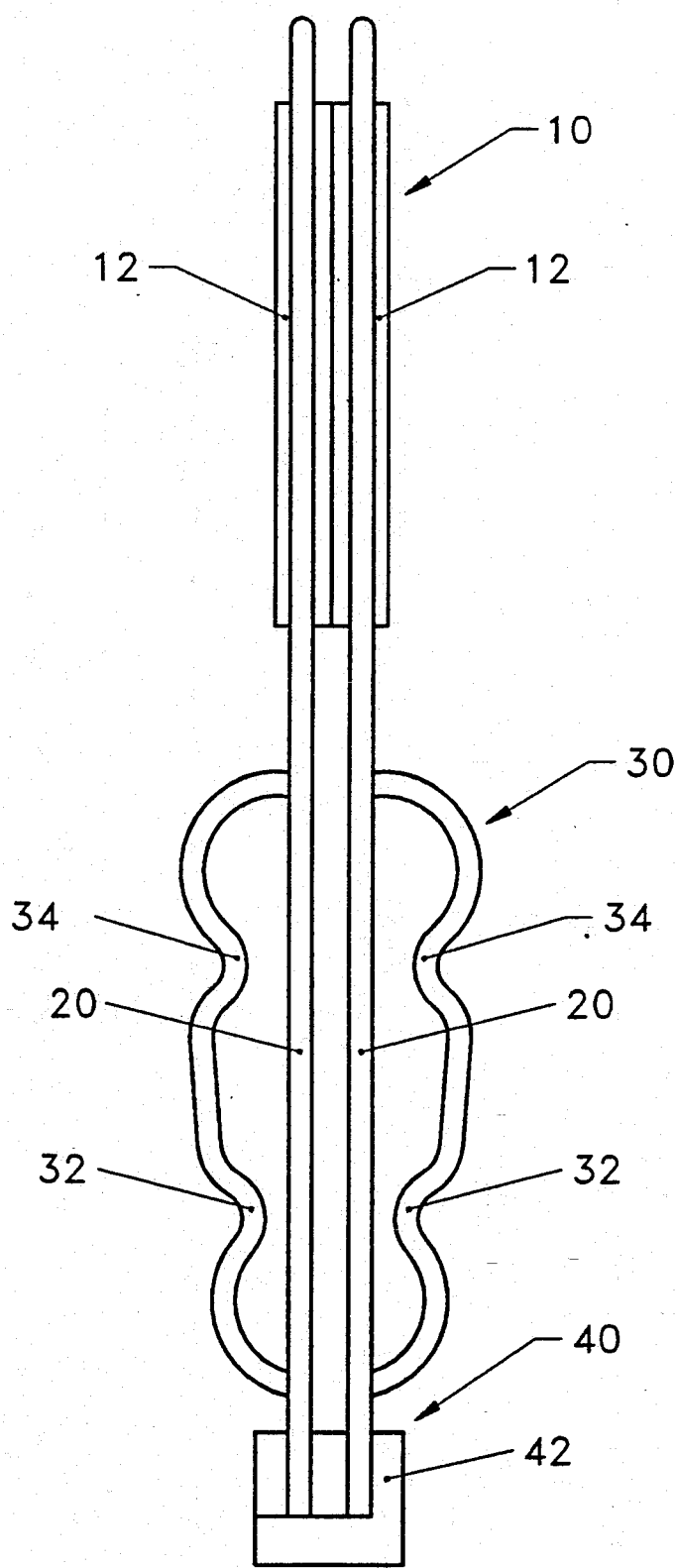
FIG. 3 is a side view of the preferred embodiment when the present invention is closed.

For the preferred embodiment, details about the placement and shape of clamps 30 and handle 10 may be seen on FIG. 2 and FIG. 3. Each clamp 30 is welded to cage 20 slightly to either side of the center-line running from the center of hinge 40 through the center of handle 10. In the preferred embodiment, each clamp 30 is placed to be essentially parallel to, and about one inch offset from, the aforementioned center-line. In cross section, clamp 30 is reminiscent of an approximation to cycles of a sine wave. The two central dips or minima (lower-grip 32 and upper-grip 34) are used to grip the bagel and thereby prevent movement of the bagel while it is being cut. Lower-grip 32 is closer to hinge 40 and upper-grip 34 is closer to handle 10. When the jig is closed on a bagel, the opposing lower-grips 32 are closer to each other than the opposing upper-grips 34. In the preferred embodiment, a distance of approximately 0.875 inches exists between the lower-grips 32, and a distance of approximately 1.125 inches exists between the upper-grips 34 when the jig is closed. The result is that a full size bagel, which comes close to filling cage 20, will be gripped more tightly by lower-grip 32 than by upper-grip 34. (The gentle curvature of clamp 30 that touches the bagel is unlikely to pierce a reasonably fresh bagel.) When a small size bagel is placed within cage 20, it slumps under the force of gravity toward hinge 40 and yet it will still be gripped by lower-grip 32.

The shape and position of the clamps 30 of the preferred embodiment is such that bagels, small and large, are gripped during and after cutting. This insures a straight cut without the bagel squirming or buckling. The present invention encompasses clamping means for gripping a bagel that extend across the periphery of the cage and that are capable of gripping bagels of various sizes without puncturing them.

In the preferred embodiment, a handle-insert 12 is snapped into place between the two sides of handle 10 and is held there by shallow grooves on each side of handle-insert 12, by the curved constriction at the distal end of handle 10, and by the placement of a handle-detent 14 in each side of handle 10 just below handle-insert 12. The thickness of handle-inserts 12 (in combination with the placement of lower-grip 32, upper-grip 34, and the cages 20 within hinge 40) is such that when handle 10 is gripped by a hand, and the two handle-inserts 12 are touching, a uniform gap is present between the two cages 20. The gap provides a guide for the passage of a knife blade through the confined bagel, may be sen on FIG. 3, and in the preferred embodiment is approximately 0.26 inches wide. In the preferred embodiment, handle-insert 12 is made of hardwood and both handle-inserts 12 are identical. Alternate embodiments will be apparent. If, for instance, the present invention were to be made by molding, it is expected that the functional equivalent of handle-insert 12 and handle-detent 14 would be integral with handle 10.

The hinge of the present invention may be any hinge means that allows the rotation of at least one of the cage-clamp-handle structures away from the other such structure and (in cooperation with handle-inserts 12) is such that when the two aforementioned structures are abutting, a gap is present between the inner edges of the cages 20 that allows the passage of a knife blade to effect the severing of a held bagel. It is desirable that the hinge be constructed of material that is unlikely to injure a knife blade that strikes it. Hinge 40 of the preferred embodiment of the present invention is constructed of wood and has a hinge-shoulder 42 that restricts the motion of the adjacent cage-clamp-handle structure from rotating with respect to hinge 40 while the absence of such a shoulder adjacent to the other cage-clamp-handle structure allows its free rotation with respect to hinge 40. Hinge 40 of the preferred embodiment is approximately 2.5 inches wide, approximately one inch deep, and approximately 0.88 inches high.

The method of using the present invention is as follows. The two halves of the present invention are rotated apart and a bagel is placed within the basket formed by cage 20 and its associated clamps 30, with the associated handle 10 generally upright. If the bagel is of a full size, it will fill most of the aforementioned basket. If the bagel is small, it will occupy the lower part of the aforementioned basket. In both cases, bringing the two halves of the present invention together so that handle-inserts 12 touch will insure that the bagel is confined without being punctured and will provide a gap between the two halves where the two cages 20 face each other. A knife blade is inserted at the top of the gap (below handle-inserts 12) with the sharp portion of the knife blade pointing towards hinge 40. Normal cutting action moves the knife blade downward towards hinge 40, severing the bagel into two essentially equal portions. During the cutting, one hand is squeezing handles 10 together while the other hand is wielding the knife with a motion away from the squeezing hand.

The preferred embodiment of the present invention has been described in detail. The embodiment described is illustrative and not restrictive.

I claim:

1. A jig for holding a bagel, comprising:

a hinge;

a first circular cage having a periphery with a portion of said periphery rotatively attached to said hinge;

a first handle affixed to said periphery of said first cage opposite to where said hinge is attached and extending radially from said first cage;

a first clamp extending between two points on said periphery of said first cage;

a second circular cage having a periphery with a portion of said periphery rotatively attached to said hinge;

a second handle affixed to said periphery of said second cage opposite to where said hinge is attached and extending radially from said second cage; and a second clamp extending between two points on said periphery of said second cage;

whereby a bagel may be placed within one of said cages, said handles brought together, and the bagel will be confined within said first cage and said second cage while being constricted by said first clamp and said second clamp; and further comprising a third clamp extending between two points on said periphery of said first cage; and a fourth clamp extending between two points on said periphery of said second cage;

wherein said first clamp, said second clamp, said third clamp, and said fourth clamp each are adapted and shaped to engage the bagel in two distinct gripping places, one of said gripping places is closer to said hinge than the other of said gripping places; and wherein said two gripping places are such that said gripping place that is closer to said hinge is adapted to grip the bagel more tightly than the other of said gripping places.

2. A hand-held jig for holding a bagel while it is being sliced by a knife having a knife blade, comprising:

a hinge;

a first circular cage, made of wire, having a periphery capable of enclosing a bagel, a portion of said periphery rotatively attached to said hinge;

a first clamping means for gripping the bagel, without puncturing the bagel, extending across said periphery of said first cage;

a first handle affixed to said periphery of said first cage opposite to where said hinge is attached and extending radially from said first cage;

a second circular cage, made of wire, having a periphery capable of enclosing a bagel, a portion of said periphery rigidly attached to said hinge;

a second clamping means for griping the bagel, without puncturing the bagel, extending across said periphery of said second cage;

a second handle affixed to said periphery of said second cage opposite to where said hinge is attached and extending radially from said second cage; and where:

when said first handle and said second handle are held together a uniform gap exists between said periphery of said first cage and said periphery of said second cage that is wide enough for passage of the knife blade.

* * * * *